United States Patent [19]

Levy et al.

[11] 3,953,135

[45] Apr. 27, 1976

[54] CURVE ANALYSIS METHOD IN COLOR PHOTOGRAPHY

[75] Inventors: Marilyn Levy, Little Silver; Milan Schwartz, Neptune, both of N.J.

[73] Assignee: The United States of America as represented by the Secretary of the Army, Washington, D.C.

[22] Filed: Mar. 4, 1975

[21] Appl. No.: 555,323

[52] U.S. Cl. .................................. 356/175; 96/23; 96/24

[51] Int. Cl.$^2$ .......................................... G01J 3/46

[58] Field of Search ................... 356/175, 202, 256; 354/20, 58; 96/23, 24

[56] References Cited

OTHER PUBLICATIONS

L. P. Clerc's Photography Theory and Practice, Vol. 3 Films, edited by D. A. Spencer, N.Y., Am. Photo, 1970, pp. 372–384.

*Primary Examiner*—John K. Corbin
*Assistant Examiner*—F. L. Evans
*Attorney, Agent, or Firm*—Nathan Edelberg; Robert P. Gibson; Roy E. Gordon

[57] ABSTRACT

A method of approximating the characteristic curves of a color film exposed at a variety of color temperatures is provided.

The method involves the use of a linear curve which relates the Δ log E change of blue and green exposure with change of color temperature. This linear curve is derived experimentally from the characteristic curves obtained by exposing several color negative films to a sensitometer, including a step tablet and a means for varying color temperatures. The films are exposed at color temperatures ranging from 2900°K to 6700°K and then processed in a color developer. Transmission densities of the developed film to red, green, and blue light are determined with a densitometer and the results plotted as a curve relating red, blue, and green density to relative log exposure. These characteristic curves are then analyzed by placing them over the curves obtained at 6700°K so that the red curves are superimposed. The change in blue and green exposure with color temperature for each set of curves is determined graphically along each curve. The Δ log E determinations are averaged and the results plotted as a linear curve relating the Δ log E change of blue and green exposure from 6700°K to 2900°K. This curve can be plotted as Δ log E vs. color temperature or Mired Value, which is a value equal to 1,000,000/color temperature. This linear curve can then be used to determine the characteristic curve of an unknown color film exposed to any color temperature providing the characteristic curve for one color temperature is determined experimentally. This is done by determining from the linear curve the Δ log E change for the blue exposure and the green exposure from the experimental color temperature to the new color temperature. The change is plotted on the characteristic curve of the known temperature to produce the predicted points for the unknown curves.

3 Claims, 5 Drawing Figures

CURVE ANALYSIS METHOD IN COLOR PHOTOGRAPHY

The invention described herein may be manufactured, used, and licensed by or for the Government for Governmental purposes without the payment to me of any royalties thereon.

BACKGROUND OF THE INVENTION

Heretofore, the only way the characteristic curve for a particular color temperature could be obtained was using an experimental technique. That is to say, the film had to be exposed on a sensitometer with the lamp set at the color temperature desired. The film was then processed, densities read on a color densitometer and the curves plotted. The difficulty with the aforementioned technique was the problem involved in setting the color temperature in the first place and the tedious experimental procedures involved in performing the entire operation.

SUMMARY OF THE INVENTION

The general object of this invention is to provide a method of approximating the characteristic curves of a color film exposed at a variety of color temperatures where the characteristic curve of the film exposed at one color temperature is known.

The aforementioned object has now been attained by a method comprising the use of a linear curve, which relates the Δ log E change of blue and green exposure with change of color temperature. This linear curve is derived experimentally from the characteristic curves obtained by exposing several color negative films to a sensitometer including a step tablet and a means for varying color temperatures. The films are exposed at color temperatures ranging from 2900°K to 6700°K; then processed in a color developer. Transmission densities of the developed film to red, green, and blue light are determined with a densitometer and the results plotted as a curve relating red, blue and green density to relative log exposure. These characteristic curves are then analyzed by placing them over the curves obtained at 6700°K so that the red curves are superimposed. The change in blue and green exposure with color temperature for each set of curves is determined graphically along each curve. The Δ log E determinations are averaged and the results plotted as a linear curve relating the Δ log E change of blue and green exposure from 6700°K to 2900°K. This curve can be plotted as Δ log E vs. color temperature or Mired Value, which is equal to 1,000,000/color temperature. This linear curve can now be used to determine the characteristic curve of an unknown color film exposed to any color temperature provided that the characteristic curve for one color temperature has been determined experimentally. This is done by determining from the linear curve the Δ log E change for the blue exposure and the green exposure from the experimental color temperature to the new color temperature. The change is plotted on the characteristic curve of the known temperature to produce the predicted points for the unknown curves.

DESCRIPTION OF THE PREFERRED EMBODIMENT

Figure 1:
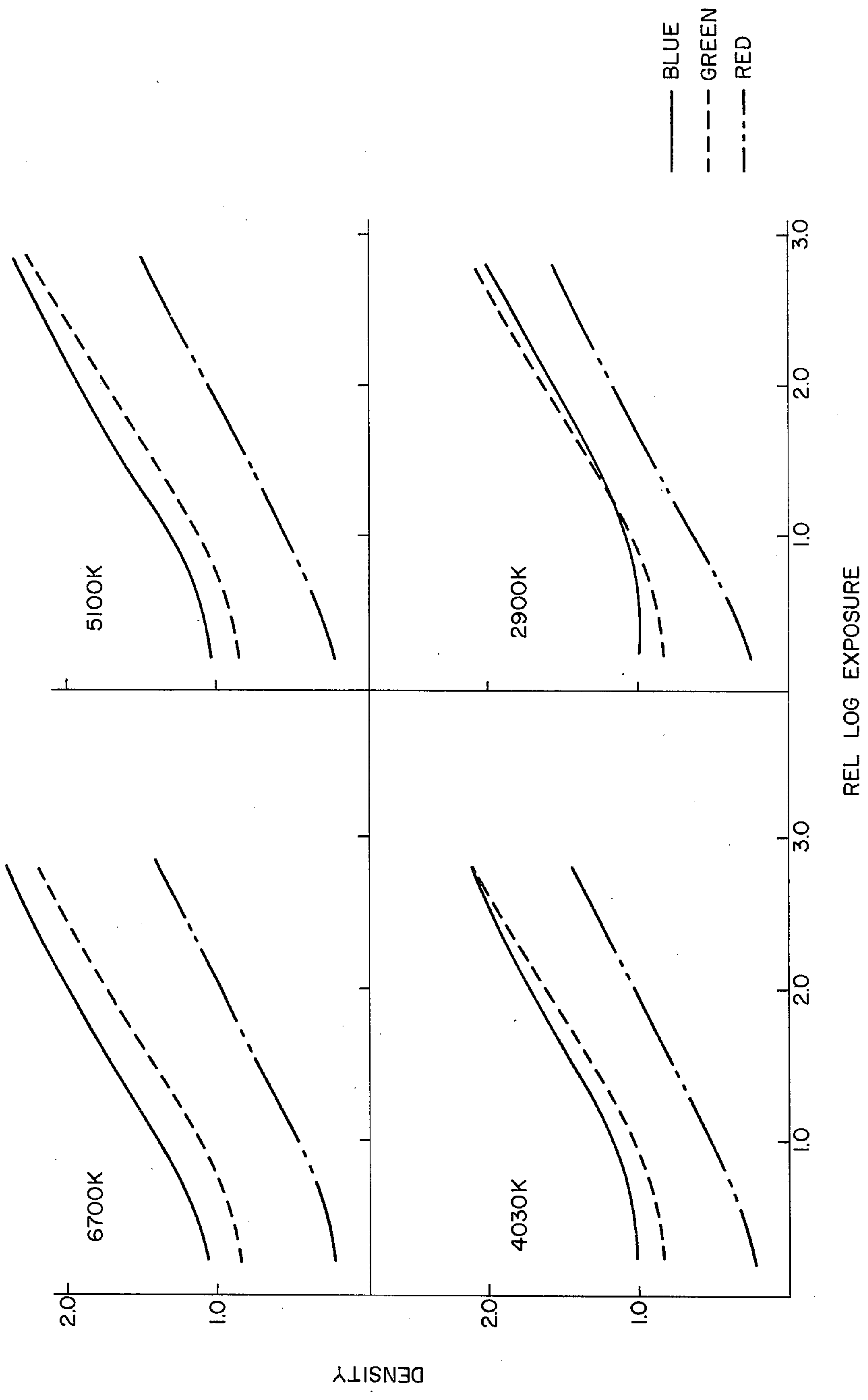
FIG. 1 shows the typical experimental characteristic curves to red, blue, and green light obtained by exposing a typical color negative film to white light varying in color temperature from approximately 2900°K to 6700°K.
Figure 2:
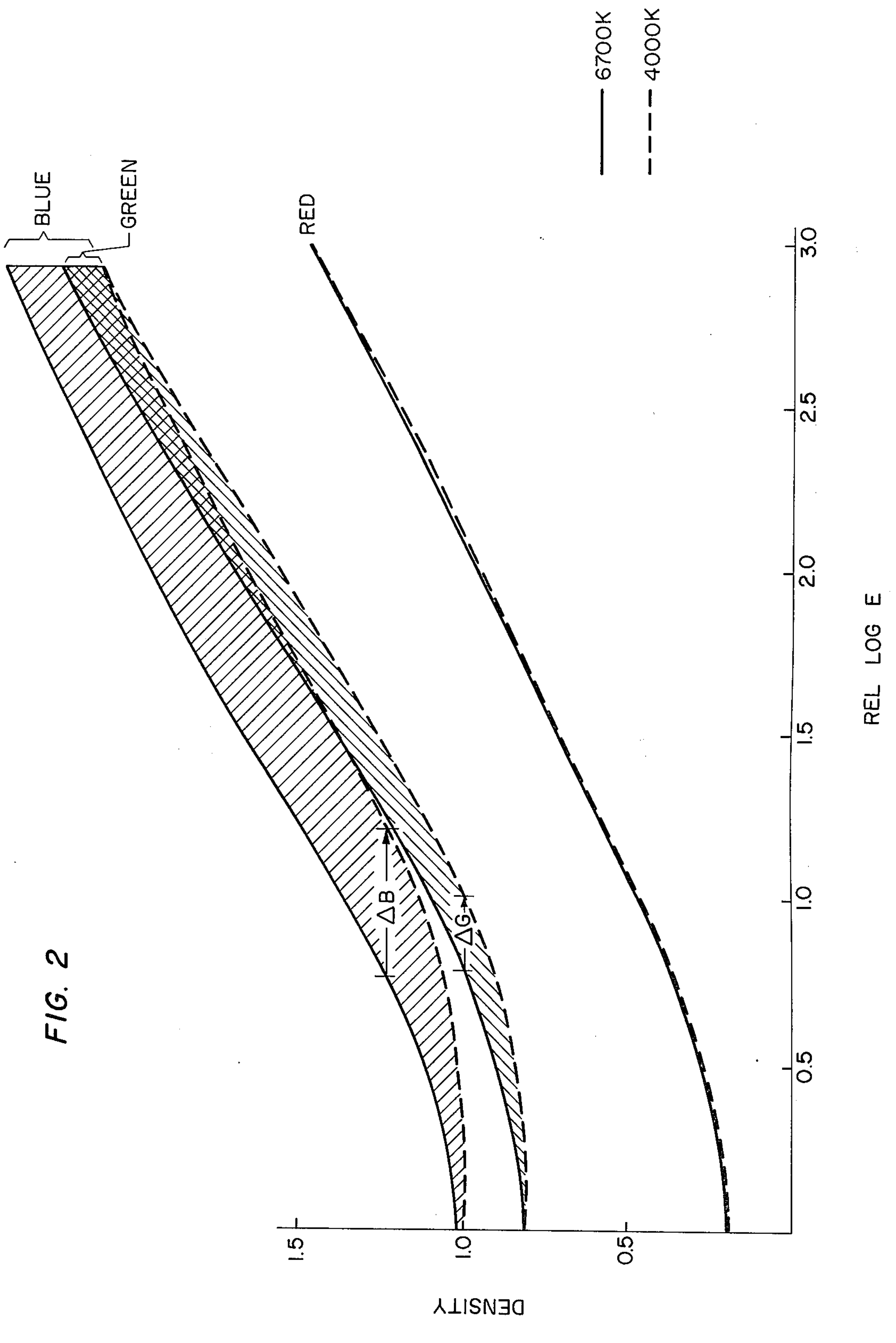
FIG. 2 shows the red, blue, and green characteristic curves of a film exposed at a color temperature of 6700°K and 4000°K in which the red curves are superimposed so that one can measure the change in blue and green exposure from one color temperature to another.
Figure 3:
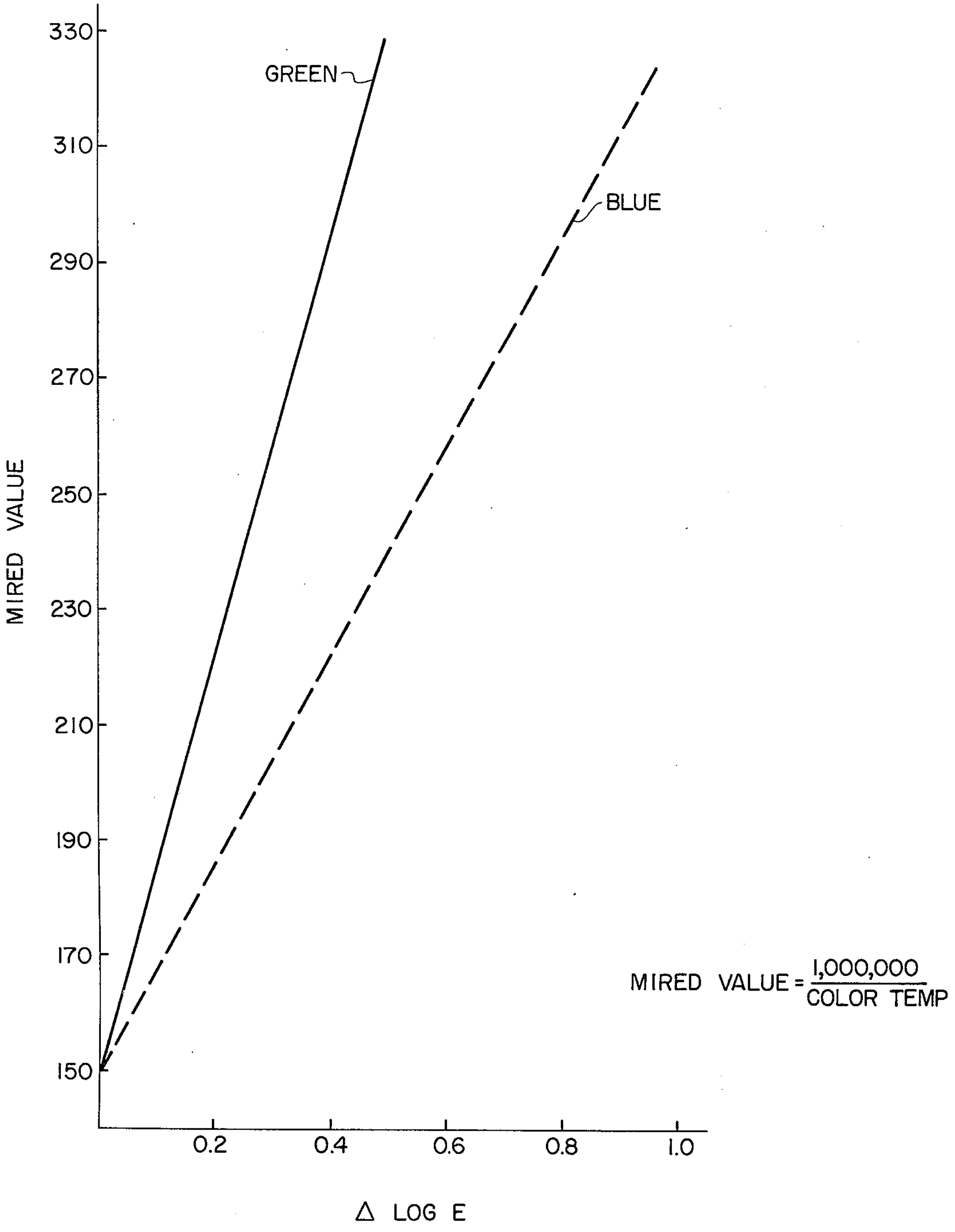
FIG. 3 shows the change in Δ log E exposure of blue and green exposure over the temperature range of exposure to the Mired Value that is derived from measuring the Δ log E change at a variety of color temperatures.

A representative color film, such as EKTACOLOR-S is exposed in a sensitometer to light varying in color temperature from approximately 2900°K to 6700°K to obtain sensitometric curves as seen in FIG. 1. These curves are then analyzed by placing each one over the curves obtained at 6700°K so that the red curves are superimposed as shown in FIG. 2. The resulting change in blue and green exposure from one color temperature to another is then represented by a fixed Δ log E change of blue and green light. The Δ log E determinations are averaged and the results plotted as a linear curve as shown in FIG. 3 relating the Δ log E change of blue and green exposure from 6700°K to 2900°K or a Mired Value of 149 to a Mired Value of 340.

Figure 4:
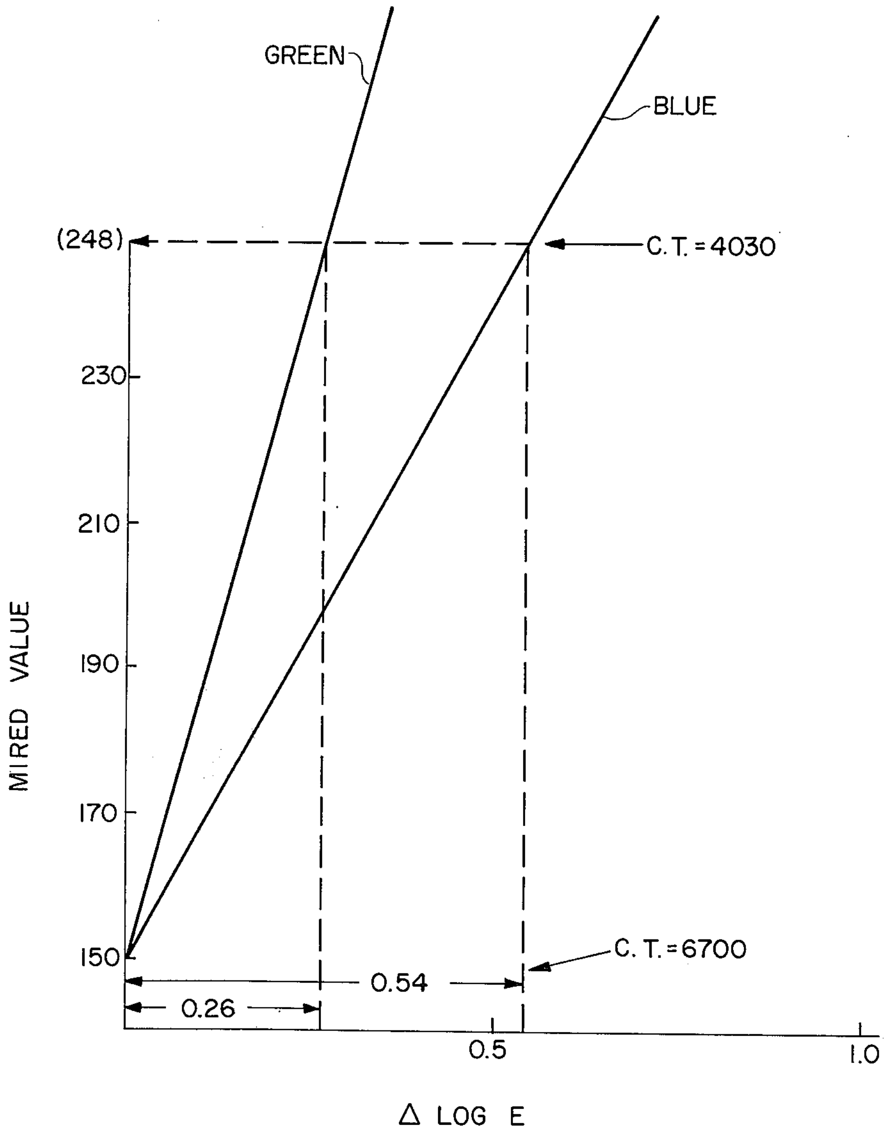
FIG. 4 shows, as an example, the Δ log E change from a color temperature of 6700°K to a color temperature of 4030°K for the blue exposure and for the green exposure.
Figure 5:
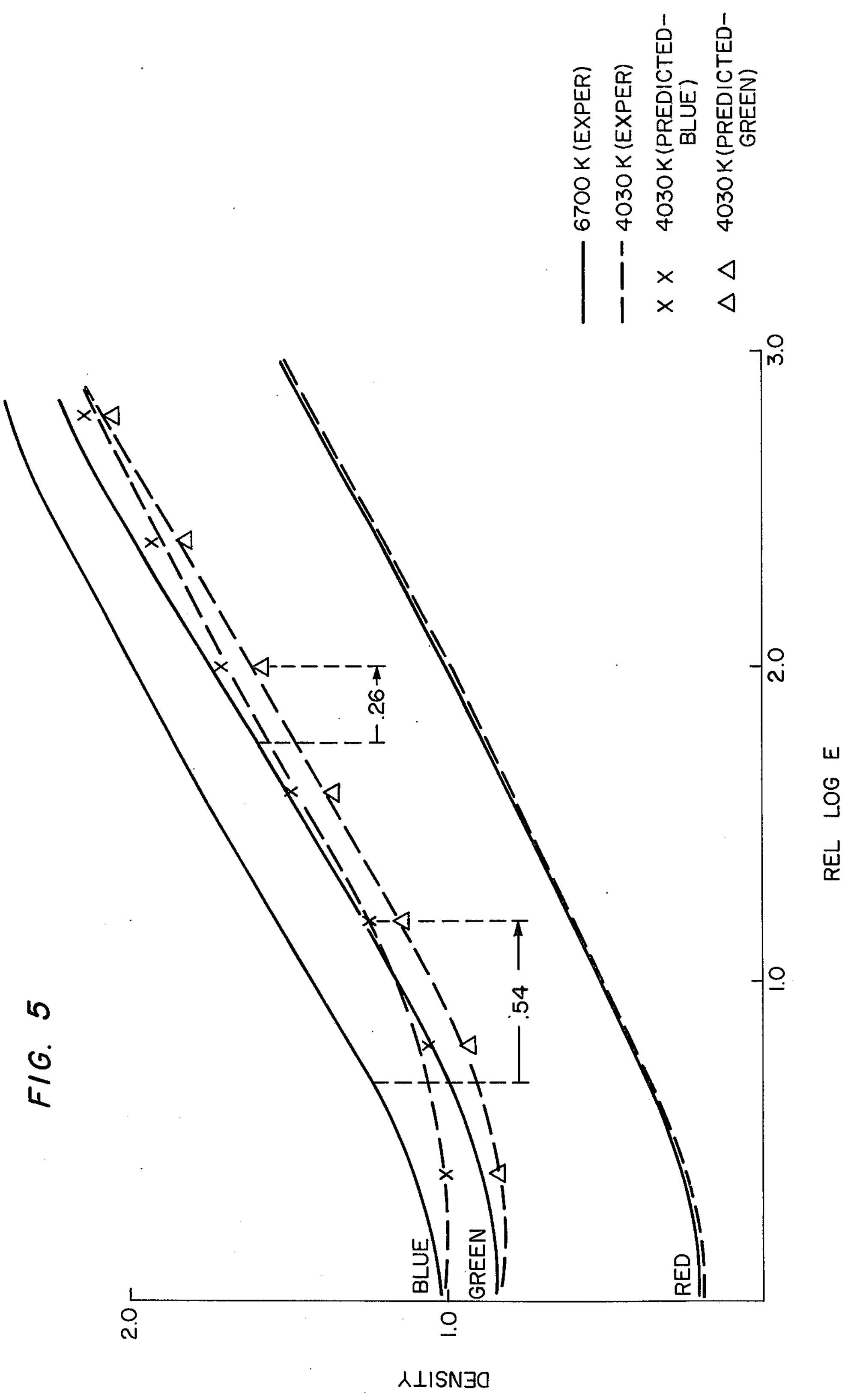
FIG. 5 shows how the predicted points for the characteristic curve at a color temperature of 4030°K is obtained when the characteristic curves at 6700°K are found experimentally.

This relationship is very useful for approximating the characteristic curves of a variety of films exposed at any color temperature between 6700°K and 2900°K. For example, suppose the sensitometer is set to produce a color temperature of 6700°K and it is desired to know the characteristics of the film exposed to a color temperature of 4030°K. As seen in FIG. 4, the Δ log E change from 6700°K or Mired Value of 149 to 4030°K or Mired Value of 248 is 0.54 for the blue exposure and 0.26 for the green exposure. By displacing the blue and green curves 0.54 and 0.26 to the right of the 6700°K curve with the red curve being held constant as seen in FIG. 5, the predicted points for the characteristic curves at 4030°K are obtained.

We wish it to be understood that we do not desire to be limited to the exact details as described, for obvious modifications will occur to a person skilled in the art. For example, the color temperatures are not limited to the range of color temperatures described and can include color temperatures as high as 10,000°K, or as low as 1200°K.

What is claimed is:

1. Method of approximating the characteristic curves of a color film exposed at a variety of color temperatures where the characteristic curve of a film exposed at one color temperature is known, said method including the steps of:

a. exposing a film in a sensitometer to light varying in color temperature to obtain characteristic curves for the exposures at the varying temperatures;

b. processing the film in a color developer;

c. determining the transmission densities of the developed film to red, green and blue light at the varying temperatures and plotting the results as curves relating the red, blue and green densities to relative log exposure;

d. analyzing these curves by placing one over the other so that the red curves are superimposed to obtain the change in blue and green exposure from one color temperature to another;

e. averaging the Δ log exposure determinations and plotting the results as a linear curve relating the Δ log exposure change of blue and green exposure over the temperature range of exposure to the Mired Value; and f. approximating the characteristic curve of a color film exposed to any color temperature in which the characteristic curve is unknown by determining from the linear curve the Δ log exposure change for the blue exposure and the green exposure from the color temperature of which the characteristic curve is known to the color temperature of which the characteristic curve is unknown and plotting the Δ log exposure changes on the characteristic curve of the known temperature to produce the predicted points for the unknown curves.

2. Method according to claim 1 wherein the color film is exposed to light varying in color temperature from approximately 1200°K to 10,000°K.

3. Method according to claim 1 wherein the color film is exposed to light varying in color temperature from approximately 2900°K to 6700°K.

* * * * *